United States Patent [19]
Nishida et al.

[11] Patent Number: 5,469,311
[45] Date of Patent: Nov. 21, 1995

[54] VIBRATION ABSORBING STRUCTURE FOR A MAGNETIC DISK APPARATUS

[75] Inventors: Hiroshi Nishida, Kanagawa; Kazuo Nakagoshi, Odawara; Kenjiro Kai, Kanagawa; Katsumoto Onoyama, Hiratsuka, all of Japan

[73] Assignee: Hitachi, Ltd., Tokyo, Japan

[21] Appl. No.: 258,920

[22] Filed: Jun. 13, 1994

Related U.S. Application Data

[63] Continuation of Ser. No. 850,432, Mar. 12, 1992, abandoned.

[30] Foreign Application Priority Data

Mar. 15, 1991 [JP] Japan .................................. 3-051133

[51] Int. Cl.⁶ ....................................... G11B 33/14
[52] U.S. Cl. ........................................... 360/97.02
[58] Field of Search ............................... 360/97.02

[56] References Cited

U.S. PATENT DOCUMENTS 5,079,655  1/1992  Yagi ..................................... 360/97.02
5,124,855  6/1992  Dew ..................................... 360/97.02

Primary Examiner—A.J. Heinz
Attorney, Agent, or Firm—Kenyon & Kenyon

[57] ABSTRACT

A magnetic disk apparatus includes a base coupled to a supporting frame by means of a damping member so that the vibration caused by the operation of the internal actuator subsides. The damping member may include an adhesive resilient material disposed between the base and the supporting frame.

14 Claims, 6 Drawing Sheets

VIBRATION ABSORBING STRUCTURE FOR A MAGNETIC DISK APPARATUS

This application is a continuation of application Ser. No. 07/850,432, filed 12 Mar. 1992, now abandoned.

BACKGROUND OF THE INVENTION

The present invention relates to a magnetic disk apparatus, and particularly to a technique to be applied effectively to a-magnetic disk apparatus equipped with a high recording density medium.

In a moving-head magnetic disk apparatus, for example, the magnetic head is moved to the position of an intended track on a magnetic disk which is a magnetic recording medium. The magnetic head is required to move quickly in the radial direction in response to a request of access to specific information recorded on the magnetic disk surface so that the access time is minimized. Accordingly, a voice coil motor of relatively high power is used for the movement and positioning of the magnetic head.

When the voice coil motor, which is fixed on the base, operates under sharp acceleration and deceleration control in response to an access request or the like, the operation causes the magnetic head carriage to vibrate. This vibration creates a bending moment on the magnetic disk apparatus relative to the base, resulting in the occurrence of off-tracking, i.e., the magnetic head moves out of the target track. This is a serious problem when it is attempted to increase the recording density by narrowing the track pitch thereby increasing the number of tracks on the magnetic disk.

The head positioning mechanism of the conventional magnetic disk apparatus which deals with this problem will be explained with reference to FIGS. 10 and 11. FIG. 10 is a perspective view, and FIG. 11 is a partial cross-sectional diagram of the head positioning mechanism.

In the head positioning mechanism, a carriage 13, which has the attachment of a servo head arm 5 for supporting a servo head 2 and a data head arm 4 for supporting a plurality of data read/write heads 3, is fitted rotatably around a pivot shaft 6 as shown by the arrow A through a bearing 12 on an I-shaped carriage block 9. The voice coil motor has its magnet 7 secured on the side surface of the carriage block 9 by screws 11, and the voice coil 8 of the voice coil motor is connected to the carriage 13.

The voice coil motor has the voice coil 8 connected to the carriage 13, which is supported rotatably on the pivot shaft 6, thereby constituting a rotary actuator. The voice coil motor is controlled in accordance with the servo signal provided by the servo head 2, and the data heads 3 are positioned to the intended tracks on the magnetic disk 21.

In this head positioning mechanism, the magnet 7 is clamped between two magnet supports 15 and a bolt 14, and fixed to the base 17 by means of screws 16 through holes 10 formed in the magnet support 15, so that the mechanism has an enhanced rigidity against the bending moment (in the direction shown by the arrow A) at the acceleration and deceleration of the rotary actuator and the vibration is damped by the frictional movement of a damping mass 18 which is placed on the carriage block 9, thereby reducing the bending moment on the carriage 13 against the base 17 (in the direction shown by the arrow B in FIG. 11).

SUMMARY OF THE INVENTION

The foregoing conventional head positioning mechanism necessitates many additional component parts such as those for clamping the magnet 7 and the damping mass 18, which adversely results in an increased cost, weight and size of the apparatus.

Accordingly, the present invention is intended to overcome the foregoing prior art deficiency, and its prime object is to provide a magnetic disk apparatus which has a simple and inexpensive structure, and is capable of effectively damping the vibration caused by the operation of the actuator.

These and other objects and novel features of the invention will become apparent from the following description taken in conjunction with the accompanying drawings.

A feature of the present invention is summarized as follows.

The magnetic disk apparatus based on an embodiment of the invention includes a magnetic operation device including a magnetic recording disk on which data is recorded, a disk driver for rotating the magnetic recording disk, a magnetic head for recording and reproducing data on the magnetic recording disk, a carriage for supporting the magnetic head, and an actuator for positioning the magnetic head to an intended position on the magnetic recording disk through the carriage. A support device supports the magnetic operation device on a main frame. A vibration damping device is disposed between the magnetic operation device and the main frame.

The magnetic disk apparatus based on an embodiment of the present invention uses a vibration damping member made up of a base plate and adhesive resilient member bonded on the base plate.

Furthermore, the magnetic disk apparatus based on an embodiment of the invention may include a magnetic operation device including a magnetic recording disk on which data is recorded, a disk driver for rotating the magnetic recording disk, a magnetic head for recording and reproducing data on the magnetic recording disk, a carriage for supporting the magnetic head, and an actuator for positioning the magnetic head to an intended position on the magnetic recording disk through the carriage. An adhesive resilient member may be arranged between the magnetic operation device and the main frame on which the magnetic operation device is mounted.

The adhesive resilient member may include a bonding material.

According to the magnetic disk apparatus based on the present invention, the vibration caused by the operation of the actuator is propagated actively to the magnetic operation device by which the actuator is supported, and the magnetic operation device is supported by a support device on the main frame with an intervening vibration damping member made of adhesive resilient material. Thus, the vibration of the main frame can be damped effectively in the arrangement of a compact, simple and inexpensive structure.

Also, according to a magnetic disk apparatus based on the present invention, the magnetic operation device is coupled to the main frame solely through the vibration damping member, whereby the vibration caused by the operation of the actuator can be damped effectively in the arrangement of a compact, simple and inexpensive structure.

DETAILED DESCRIPTION

The magnetic disk apparatus based on an embodiment of the present invention will be described in detail with reference to the drawings.

Figure 1:
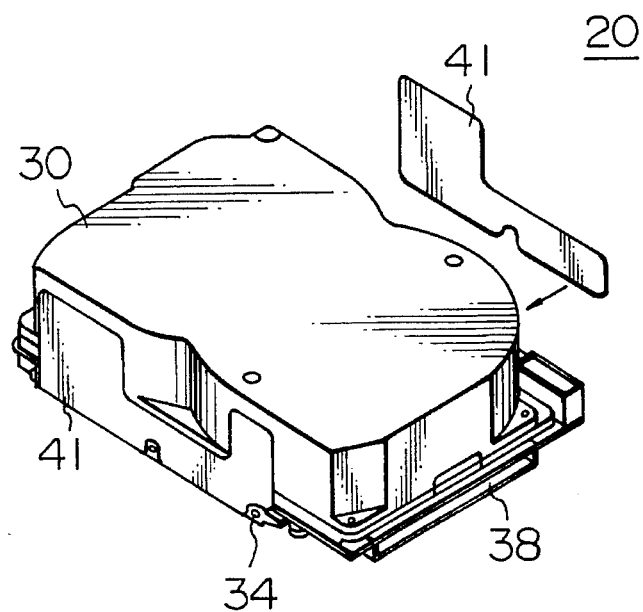
FIG. 1 is an external perspective view showing the structure of the magnetic disk apparatus based on an embodiment of the present invention.
Figure 2:
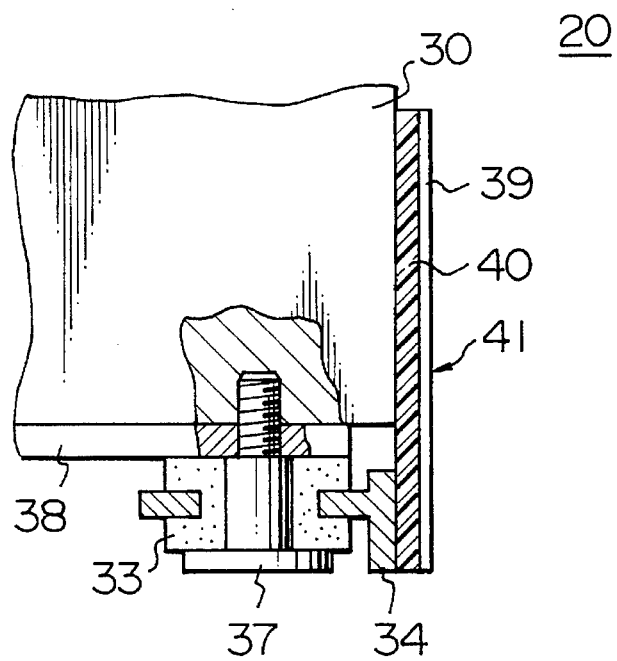
FIG. 2 is a simplified cross-sectional diagram showing part of the magnetic disk apparatus shown in FIG. 1.
Figure 3:
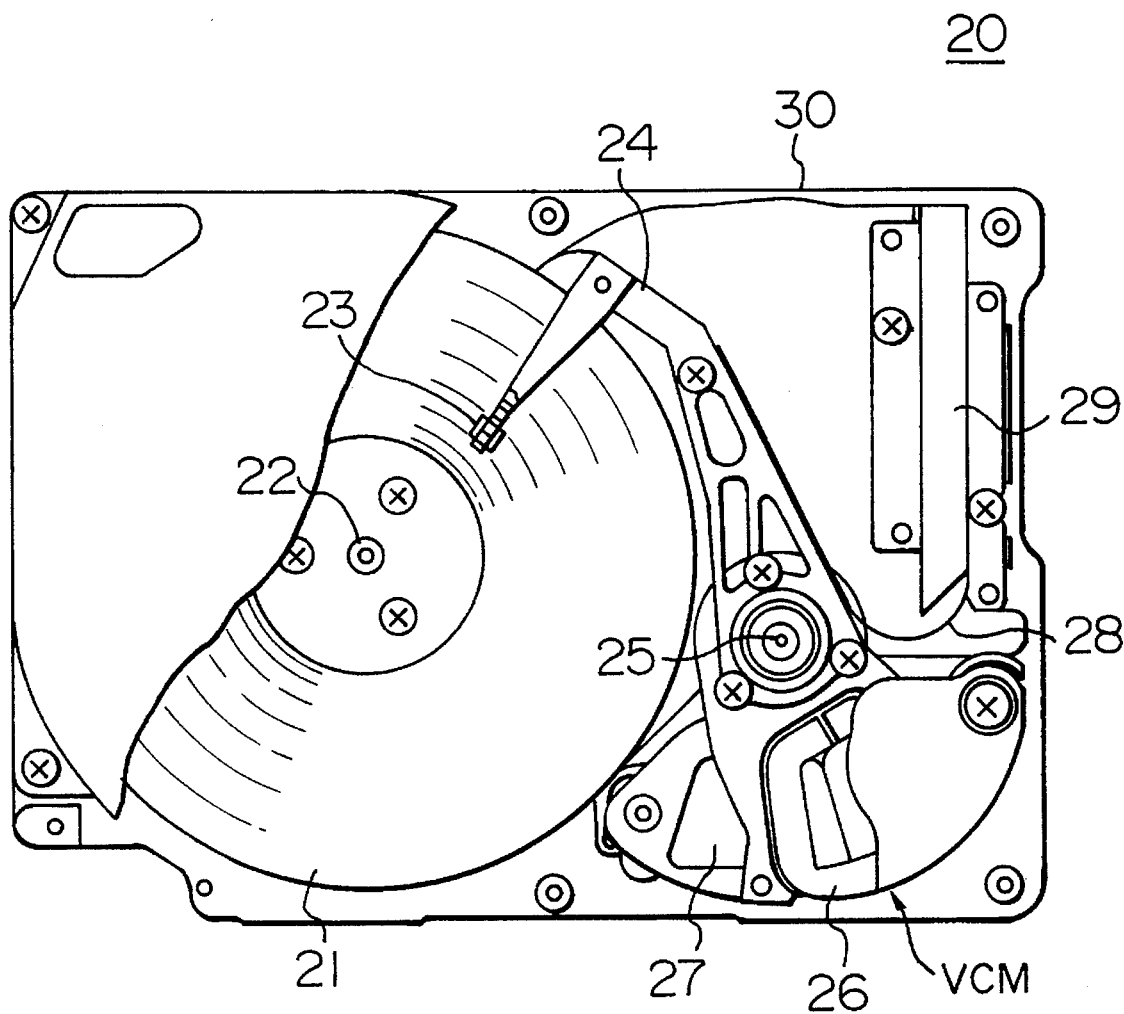
FIG. 3 is a plan view of the structure of the magnetic disk apparatus shown in FIG. 1 with part of the structure cut away.

FIG. 1 is an external perspective view showing, as an example, the structure of the magnetic disk apparatus 20 based on an embodiment of the present invention. FIG. 2 is a simplified cross-sectional diagram showing part of the apparatus of FIG. 1. FIG. 3 is a plan view showing the apparatus of FIG. 1 with a partial cut away.

The magnetic disk apparatus 20 of this embodiment comprises a magnetic recording disk 21, a spindle 22 for rotating the disk 21 at a constant revolutional speed, a magnetic head 23 for reading and writing data on the disk 21, a carriage 24 which supports the magnetic head 23, a voice coil motor (VCM) including a coil 26 and a magnetic circuit 27 for swinging the carriage 24 around a pivot 25 so as to position the magnetic head 23 to an intended position on the disk 21, a flexible printed circuit board 28 which conducts the recording/playback signals from the magnetic head 23 to a circuit unit 29 including amplifiers, and a base 30 on which these component parts are mounted.

A circuit board 38 is attached to the bottom of the base 30. The base is fixed to a frame 34 through vibration preventive studs 33 which are pinned by means of special screws 37, as shown in FIG. 2.

The frame 34 and base 30 are connected together on their sides by means of a vibration damping member 41 comprised of a clamp plate 39 and an adhesive resilient material 40, so that the vibration arising at the acceleration and deceleration of the carriage 24 which is driven by the voice coil motor mounted on the base 30 is damped and dissolved instantaneously by the vibration damping member 41.

The clamp plate 39 may be made of a plate of copper having an electromagnetic shielding effect so that it also serves as a shield against the external electromagnetic influence. Alternatively the plate may be made of stainless steel aluminum or the like.

The vibration damping member 41 and adhesive resilient material 40 are available commercially in a variety of shapes such as sheets and blocks. It is also possible to set the vibration damping frequency by properly choosing the characteristics of the adhesive resilient material 40. Among the adhesive resilient materials of the acryl, rubber and silicon bases, the embodiment uses the acryl-based bonding material which is superior in durability, with its viscosity ranging from $3 \times 10^5$ to $10 \times 10^5$ cps. The adhesive resilient material 40 is available in thickness from 0.2 to 0.5 mm, and the embodiment uses a thickness of 0.3 mm in thickness. The viscosity and thickness of the adhesive resilient material 40 is determined depending on the mass of the base 30 or magnetic disk apparatus 20.

Figure 7:
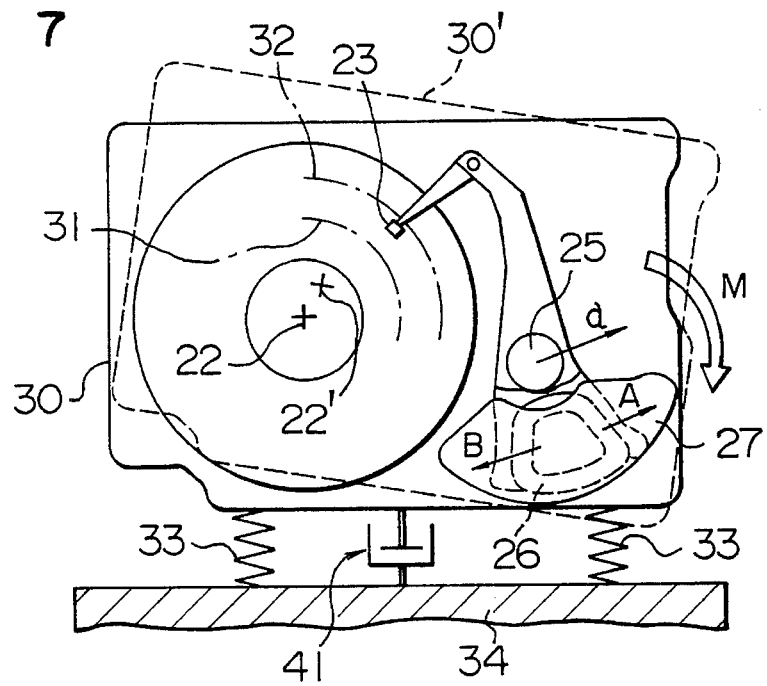
FIGS. 7, 8 and 9 are diagrams for explaining the operation of the magnetic disk apparatus based on an embodiment of the invention.
Figure 8:
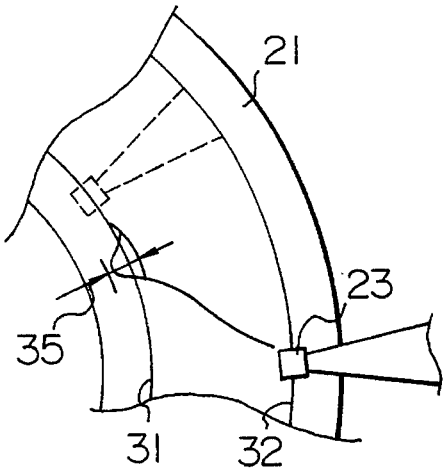
Figure 9:
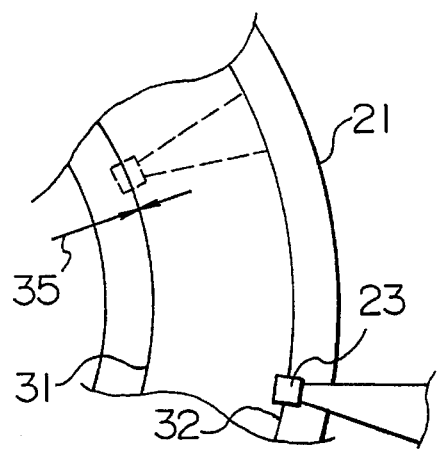
Figure 10:
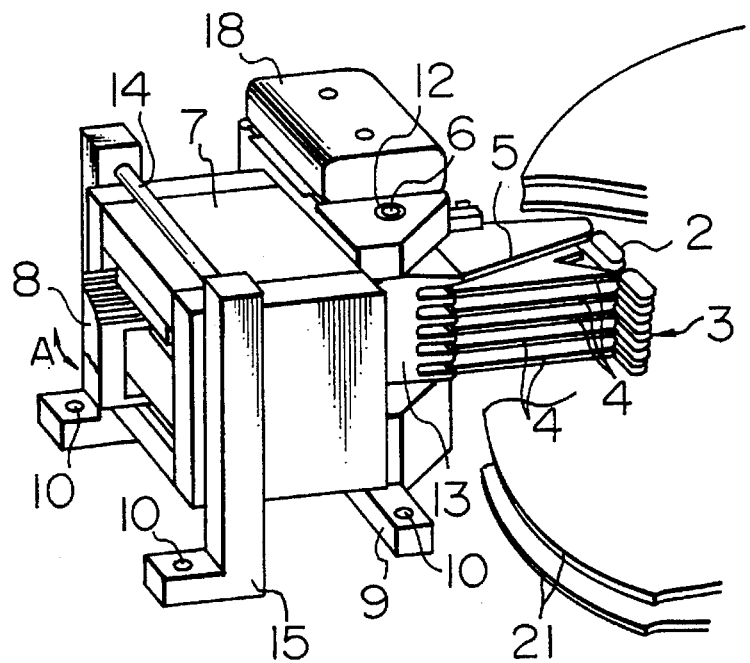
FIG. 10 is a perspective view of the head positioning mechanism of a conventional magnetic disk apparatus.
Figure 11:
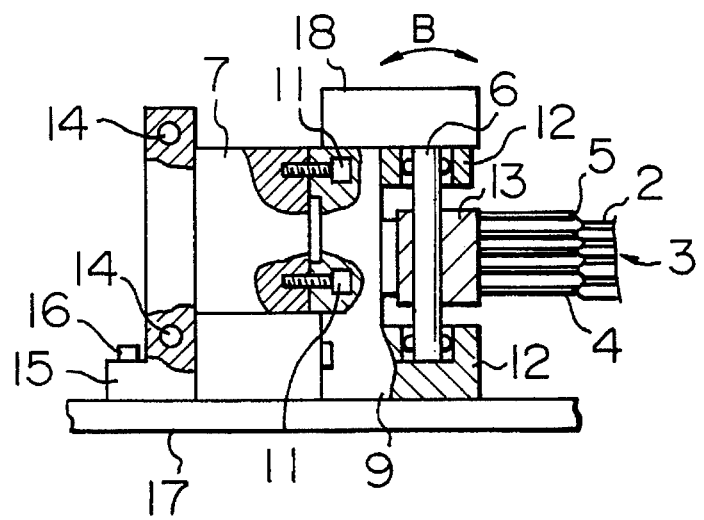
FIG. 11 is a cross-sectional diagram showing part of the magnetic disk apparatus shown in FIG. 10.

The operation of the magnetic disk apparatus based on this embodiment will be explained with reference to FIGS. 7, 8 and 9.

The following example of operation is the case when the magnetic disk apparatus 20 has received the seek command for moving the magnetic head 23 to a recording track from a host controller or the like. On receiving the seek command for moving the magnetic head 23 from an outer track 32 to an inner track 31, a current is supplied to the coil 26 of the voice coil motor, and the coil 26 produces a force as shown by the arrow A in FIG. 7 based on the electromagnetic mutual action between the coil and magnetic circuit 27. A counter force (shown by the arrow B) arises against the force of A, and it acts on the base 30 to move in the direction of arrow B since the magnetic circuit 27 is fixed to the base 30. At the same time, a force shown by a is applied to the pivot 25 in the direction of the arrow A, and this force acts on the base 30 to move in the direction of a since the pivot 25 is fixed to the base 30.

The counter forces B and a acting on the base 30 are opposite in direction and have different acting points, producing a moment M. Accordingly, the base 30 is swung as shown by the dashed line 30', and the spindle 22 which is secured on the base 30 also moves to the position indicated by 22'.

In the conventional structure, in which the base 30 is protected from the external vibration and shock solely by means of the vibration preventive studs 33, the motion of the spindle caused by the counter force of the head movement will last after the seek operation has completed due to the pronounced spring effect of the studs 33. Consequently, the spindle 22 vibrates at the natural frequency determined from the mass of the base 30 and the spring coefficient of the studs 33.

According to the conventional vibration preventive measure which solely relies on the vibration preventive studs 33, the vibration of the spindle 22 creates a positioning error (track off) of the magnetic head 23 with respect to the magnetic recording disk 21 which is supported by the spindle 22. The spindle vibration hinders the accurate positioning operation and prolongs the settling time which is a period of time until the residual vibration of the spindle 22 subsides small enough to perform accurate positioning.

In contrast, according to the embodiment of the present invention, in which the vibration preventive studs 33 are combined with the vibration damping member 41, the residual vibration of the base 30 subsides quickly by the pronounced vibration damping action of the adhesive resilient material 40 of the vibration damping member 41 which is interleaved between the base 30 and the frame 34, and consequently the positioning error of the magnetic head 23 on the target track 31 is minimized. Thus, settling time is reduced significantly, as shown in FIG. 9.

The vibration damping member 41 in the form of a thin sheet can easily be bonded on the base 30, and the magnetic disk apparatus 20 can have a reduced weight and size and enhanced performance based on the reduction of residual vibration at the same time.

Figure 4:
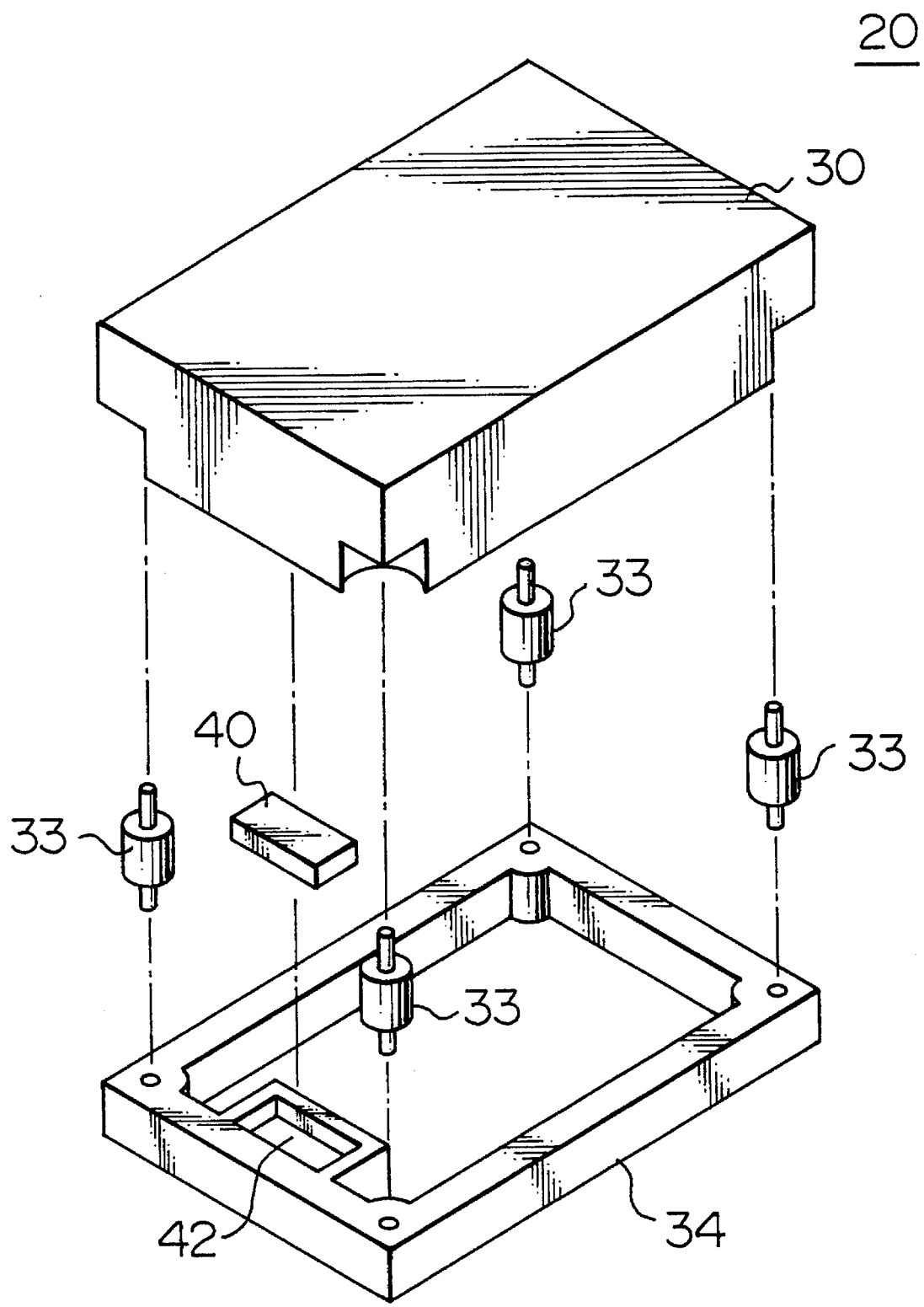
FIG. 4 is a perspective diagram showing the assembling and disassembling of the magnetic disk apparatus based on another embodiment of the present invention.
Figure 5:
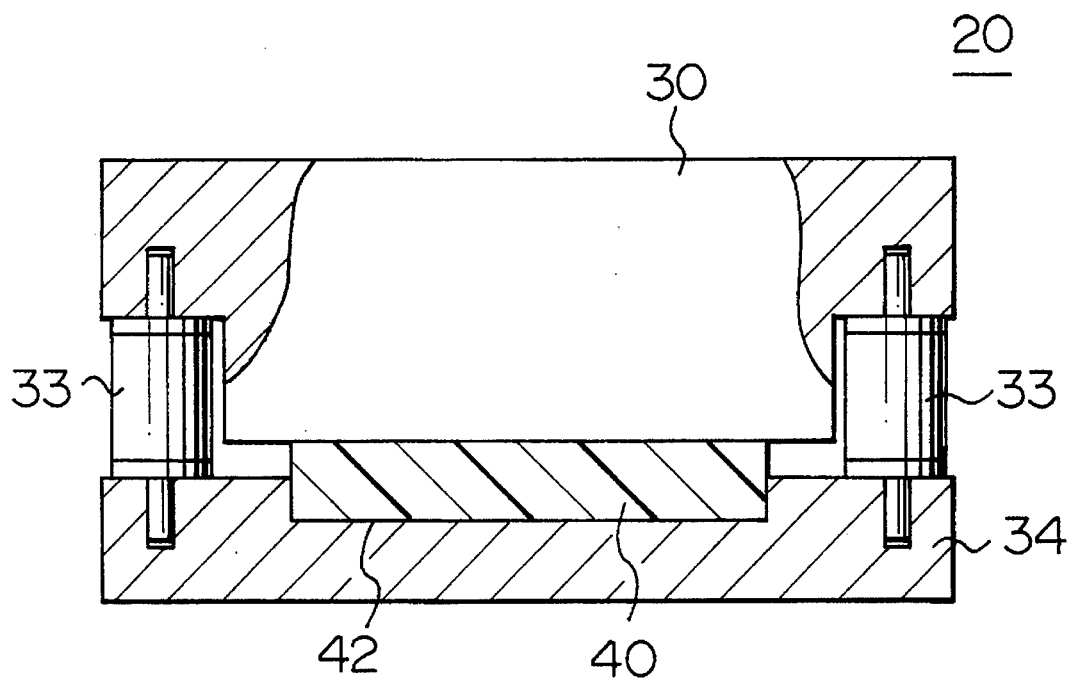
FIG. 5 is a cross-sectional diagram showing part of the magnetic disk apparatus shown in FIG. 4.

FIG. 4 is a perspective diagram showing the assembling and disassembling of the magnetic disk apparatus 20 based on another embodiment of the present invention, and FIG. 5 is a cross-sectional diagram showing part of the apparatus. In this embodiment, the frame 34 which supports the base 30 through multiple vibration preventive studs 33 has a formation of a recess 42 on the surface confronting the base 30. An adhesive resilient material 40, is disposed in the recess 42 with its main surface being in contact with the bottom of the base 30, so that the base 30 is coupled with the frame 34 through the adhesive resilient material 40. Based on this structure, the adhesive resilient material quickly damps the vibration of the base 30.

Figure 6:
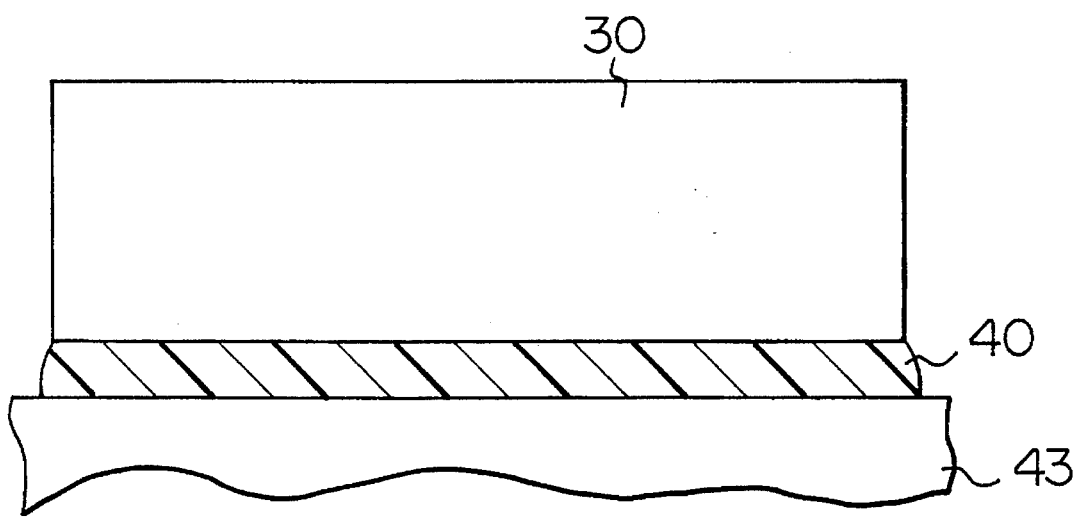
FIG. 6 is a side view of the principal portion of the magnetic disk apparatus based on still another embodiment of the present invention.

FIG. 6 is a side view of the principal portion of the magnetic disk apparatus 20 based on another embodiment of the present invention. The structure of the embodiment is designed to mount the base 30 of the magnetic disk apparatus 20 to the user's main frame solely through a adhesive resilient material 40, and the vibration preventive studs 33 are not used.

In the case of a magnetic disk apparatus 20 (with a disk diameter of 3.5 inches or less) having a relatively compact and light-weight base 30, the movement of the base 30 due to the external vibration and shock is small enough to eliminate the need of the spring element for bringing the base 30 back to the original position, i.e., the vibration preventive studs 33 are unnecessary.

This embodiment achieves the same effectiveness as those of the preceding embodiments, and in addition the elimination of the vibration preventive studs 33 simplifies the structure.

Although specific embodiments of the present invention have been described, the present invention is not confined to these embodiments, but various alterations are possible within the scope of the substantial matter of the invention.

The major effectiveness attained by the invention is summarized as follows. The magnetic disk apparatus of the present invention overcomes the complex, bulky and expensive structure which typifies the conventional damping mass scheme, and is capable of damping the residual vibration which otherwise arises in the seek operation of the magnetic head. It does so by means of a compact, light weight and inexpensive structure. The spring element and adhesive resilient element can be designed separately, which allows the expanded latitude of selection of each material, and the inventive technique can further be applied to a tool positioning operation of NC (numerical control) machine tools, drawers and plotters.

What is claimed is:

1. A magnetic disk apparatus comprising:
   a) a magnetic operation mechanism including:
      (i) a magnetic recording disk for recording data;
      (ii) a rotational driver for rotating said magnetic recording disk;
      (iii) a magnetic head for recording and reproducing data concerning said magnetic recording disk;
      (iv) a carriage for supporting said magnetic head; and
      (v) an actuator for driving said carriage so as to position along said magnetic recording disk;
   b) a main frame;
   c) a support member supporting said magnetic operation mechanism on said main frame; and
   d) a clamp plate;
   e) a viscosity elastic material substantially in the form of a sheet having a smaller thickness dimension relative to its length-width dimensions, adhesively disposed among said main frame, said magnetic operation mechanism and said clamp plate, said clamp plate clamping said magnetic operation mechanism and said main frame with the viscosity elastic material which resiliently supports said magnetic operation mechanism and said main frame.

2. A magnetic disk apparatus according to claim 1, wherein a thickness of said viscosity elastic material ranges from 0.2 to 0.5 mm.

3. A magnetic disk apparatus according to claim 2, wherein said viscosity elastic material is applied to said main frame, said magnetic operation mechanism and said clamp plate to support sidewards said magnetic operation mechanism on said main frame together with said support member.

4. The magnetic disk apparatus according to claim 1, wherein said clamp plate is sheets-shaped.

5. The magnetic disk apparatus according to claim 1, wherein said viscosity elastic material is basically made of acryl, rubber or silicon resin, a viscosity thereof ranging from 300,000 to 1,000,000 cps.

6. The magnetic disk apparatus according to claim 1, wherein said clamp plate is made of copper, stainless steel, aluminum or other electromagnetic shielding materials.

7. A magnetic disk apparatus comprising:
   a) a magnetic operation mechanism including,
      (i) a magnetic recording disk for recording data,
      (ii) a rotational driver for rotating said magnetic recording disk,
      (iii) a magnetic head for recording or reproducing data to or from said magnetic recording disk,
      (iv) a carriage for supporting said magnetic head, and
      (v) an actuator for driving said carriage so as to position said magnetic head to an intended position on said magnetic recording disk;
   b) a main frame;
   c) a first viscosity elastic material substantially in the form of a sheet having a smaller thickness dimension relative to its length-width dimensions;
   d) a clamp plate clamping said magnetic operation mechanism and said main frame with the first viscosity elastic material adhesively disposed among said main frame, said magnetic operation mechanism and said clamp plate which resiliently supports said magnetic operation mechanism and said main frame;
   e) a second viscosity elastic material; and
   f) a vibration preventive stud t:or resiliently supporting said magnetic operation mechanism on said main frame via said second viscosity elastic material, which is disposed between said vibration preventive stud and said main frame supporting therebetween.

8. A magnetic disk apparatus comprising:
   a) a magnetic disk drive mechanism;
   b ) a main frame;
   c) a viscous elastic material substantially in the form of a sheet having a smaller thickness dimension relative to its length-width dimensions;
   d) a clamp plate clamping said magnetic disk drive mechanism and said main frame with the viscous elastic material bonded in place among said main frame, said magnetic disk drive mechanism and said clamp plate.

9. The magnetic disk apparatus according to claim 8, wherein a thickness of said viscous, elastic material ranges from 0.2 to 0.5 mm.

10. The magnetic disk apparatus according to claim 8, further comprising a support member vertically supporting said magnetic disk drive mechanism, wherein said viscosity elastic material is applied to said main frame, said magnetic disk drive mechanism and said clamp plate to support said magnetic disk drive mechanism horizontally on said main frame together with said support member.

11. The magnetic disk apparatus according to claim 8, further comprising:

a) a vibration preventative stud; and
   b) a second viscous elastic material, said vibration preventative stud resiliently supporting said magnetic disk drive mechanism on said main frame via said second viscosity elastic material, and said second viscosity elastic material being disposed between said vibration preventative stud and said main frame and supporting therebetween.

12. The magnetic disk apparatus according to claim 8, wherein said clamp plate is shaped like a sheet.

13. The magnetic disk apparatus according to claim 8, wherein said viscous elastic material comprises acryl, rubber or silicon resin, which has a viscosity ranging from 300,000 to 1,000,000 cps.

14. The magnetic disk apparatus according to claim 8, wherein said clamp plate comprises copper, stainless steel, aluminum or other electromagnetic shielding materials.

\* \* \* \* \*

UNITED STATES PATENT AND TRADEMARK OFFICE
CERTIFICATE OF CORRECTION

PATENT NO. : 5,469,311
DATED : November 21 1995
INVENTOR(S) : Hiroshi NISHIDA et al.

It is certified that error appears in the above-indentified patent and that said Letters Patent is hereby corrected as shown below:

| Column | Line | |
|---|---|---|
| 4 | 7 | Delete "in thickness". |
| 4 | 63 | Before "settling" insert --the--. |
| 6 | 51 | Change "t:or" to --for--. |

Signed and Sealed this

Fourteenth Day of May, 1996

Attest:

BRUCE LEHMAN

*Attesting Officer*       *Commissioner of Patents and Trademarks*